(12) United States Patent
Denton et al.

(10) Patent No.: US 11,919,728 B2
(45) Date of Patent: Mar. 5, 2024

(54) CONVEYOR ASSEMBLY FOR LOADING A WOOD-CHIPPER

(71) Applicants: Adds Up Engineering Pty Ltd (an Australian company), Red Hill (AU); Steinhardt Corporation Pty Ltd (an Australian company), Red Hill (AU)

(72) Inventors: Anthony David Denton, Bundaberg (AU); John Vaughan, Walkervale (AU); Jason Green, Bundaberg (AU)

(73) Assignee: Adds Up Engineering Pty Ltd, Bundaberg (AU)

( * ) Notice: Subject to any disclaimer, the term of this patent is extended or adjusted under 35 U.S.C. 154(b) by 232 days.

(21) Appl. No.: 17/394,688

(22) Filed: Aug. 5, 2021

(65) Prior Publication Data
US 2022/0041382 A1   Feb. 10, 2022

(30) Foreign Application Priority Data
Aug. 6, 2020   (AU) ................................ 2020902772

(51) Int. Cl.
*B65G 65/06*   (2006.01)
*B02C 18/22*   (2006.01)
*B27L 11/02*   (2006.01)

(52) U.S. Cl.
CPC .......... *B65G 65/06* (2013.01); *B02C 18/2225* (2013.01); *B27L 11/02* (2013.01); *B65G 2203/041* (2013.01); *B65G 2814/0343* (2013.01)

(58) Field of Classification Search
CPC .............. B65G 65/06; B65G 2203/041; B65G 2814/0343; B65G 2814/0328; B65G 2814/0326; B27L 11/02; A01G 3/002; B02C 18/225; B02C 18/2225; B02C 18/00; B02C 2201/066
See application file for complete search history.

(56) References Cited

U.S. PATENT DOCUMENTS

| | | | | |
|---|---|---|---|---|
| 1,771,025 A * | 7/1930 | Barry | ..................... | A01G 3/002 239/651 |
| 2,628,729 A * | 2/1953 | Borchers | ................... | B60P 3/00 414/334 |
| 3,162,600 A * | 12/1964 | Montgomery | ............ | B07B 1/10 171/119 |

(Continued)

*Primary Examiner* — Glenn F Myers
(74) *Attorney, Agent, or Firm* — Thrive IP®; Jeremy M. Stipkala; William La Salle, III

(57) ABSTRACT

A conveyor assembly for raising and feeding debris such as fallen branches from an orchard floor to a processor such as a wood-chipper is provided. The conveyor assembly comprises a body including a floor having a leading end for location adjacent ground level and a trailing end for location above the leading end in use. A ground contact arrangement is located toward the leading end extends beneath the leading end to thereby raise the leading end above ground level. A powered leading feed roller is disposed adjacent the leading end of the floor to direct members from ground on to the floor. A powered, primary infeed roller is located rearward the leading infeed roller and is arranged to move toward and away from the floor to accommodate members between said roller and the floor and urge the members, such as fallen branches rearward for entry into an inlet of the wood-chipper.

20 Claims, 11 Drawing Sheets

(56) References Cited

U.S. PATENT DOCUMENTS

| | | | | | |
|---|---|---|---|---|---|
| 3,927,780 | A | * | 12/1975 | Dearlove | B65F 3/18 198/308.1 |
| 3,955,765 | A | * | 5/1976 | Gaitten | B27L 11/02 241/101.76 |
| 4,062,498 | A | * | 12/1977 | Szepaniak | A01G 3/002 241/101.76 |
| 5,596,784 | A | * | 1/1997 | Tolmachoff | E01H 1/106 15/83 |

* cited by examiner

CONVEYOR ASSEMBLY FOR LOADING A WOOD-CHIPPER

CROSS-REFERENCE TO RELATED APPLICATIONS

The present application claims priority from Australian provisional patent application No. 2020902772, filed 6 Aug. 2020, the content of which is hereby incorporated herein by reference in its entirety for all purposes.

COPYRIGHT NOTICE

A portion of the disclosure of this patent document contains material which is subject to copyright protection. The copyright owner has no objection to the facsimile reproduction by anyone of the patent document or the patent disclosures, as it appears in the Patent and Trademark Office patent file or records, but otherwise reserves all copyright rights whatsoever.

TECHNICAL FIELD

The present invention is directed to a conveyor assembly for picking up debris such as branches from an outdoor area such as an orchard and which is arranged to feed the debris into a processing assembly such as a wood-chipper.

BACKGROUND

Any references to methods, apparatus or documents of the prior art are not to be taken as constituting any evidence or admission that they formed, or form part of the common general knowledge.

Powered wood-chippers are used to convert tree branches into wood chips that can be used as mulch for example. Such a wood-chipper typically includes a raised inlet to one or more powered infeed rollers. The infeed rollers hold the branches and progress them to an internal chipping assembly which typically comprises a rotating chipper drum with a number of axially spaced openings. Blades are fitted along one axial side of each pocket for chipping the branches as they are progressively pushed against the chipper drum. A powered wood-chipper typically includes a combustion engine for rotating the chipper drum and the feed rollers.

One agricultural area where wood-chippers are often used is that of orchards. In orchards crop bearing trees, for example fruit or nut trees are typically arranged in long rows forming alleys in between. During routine orchard maintenance operations trees and branches are pruned by orchard workers and dropped to the ground. In order to remove such material a wood-chipper may be towed into a desired position along the alley. For example, in one scenario the wood-chipper may be towed behind a truck, to a position where it is parked. Workers then manually load raised inlet of the wood-chipper with the cut branches. The wood-chipper chips the branches and delivers the chips from an elevated outlet chute into a storage area at the rear of the truck.

Upon the area surrounding the current position of the wood-chipper being cleared of fallen branches the wood-chipper is then towed to a further point between the rows for further clearing of the fallen branches to be performed.

In another scenario the wood-chipper is slowly towed behind a tractor down the alley with an inlet side of the wood-chipper facing at right angles to the direction of travel. Workers load the wood-chipper inlet as it moves down the alley with bin transported alongside the wood-chipper to collect chips from the wood-chipper's outlet chute.

Both of the scenarios involve lifting the fallen branches from the ground into the inlet of the wood-chipper.

It would be advantageous if an apparatus were provided for bringing branches from the ground to a higher level such as the level of an inlet to a processing appliance, for example a wood-chipper.

SUMMARY OF THE INVENTION

While the disclosure provides certain specific embodiments, the invention is not limited to those embodiments. A person of ordinary skill will appreciate from the description herein that modifications can be made to the described embodiments and therefore that the specification is broader in scope than the described embodiments. All examples are therefore non-limiting.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DETAILED DESCRIPTION OF PREFERRED EMBODIMENTS

Figure 1:
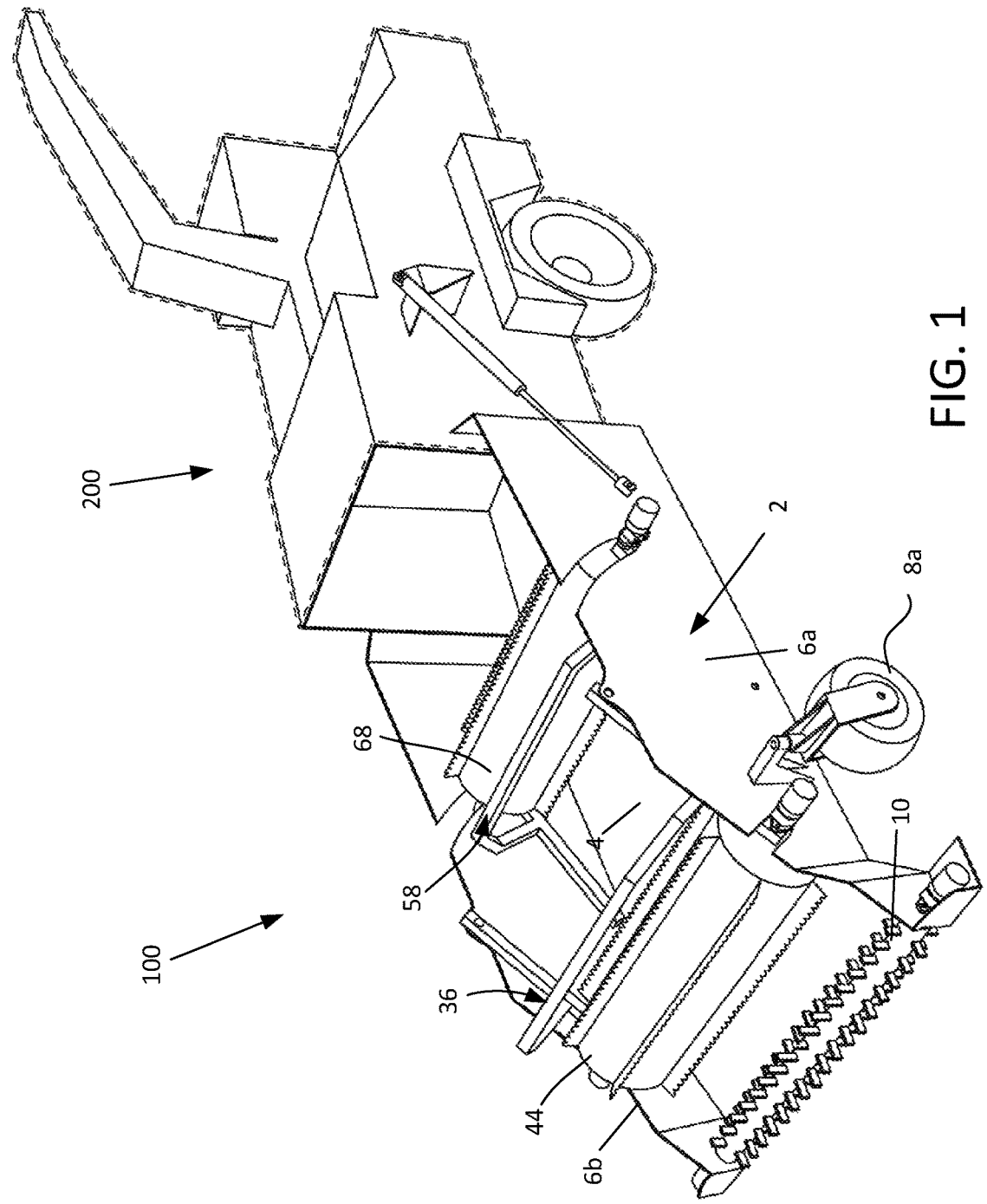
FIG. 1 is a view of a front top and left-hand side of an embodiment of a conveyor assembly shown coupled to a wood-chipper.

As required, detailed embodiments of the present invention are disclosed herein; however, it is to be understood that the disclosed embodiments are merely exemplary of the invention that may be embodied in various forms. The figures are not necessarily to scale, and some features may be exaggerated to show details of particular components. Therefore, specific structural and functional details disclosed herein are not to be interpreted as limiting, but merely as a basis for the claims and as a representative basis for teaching one skilled in the art to variously employ the present invention.

Unless defined otherwise, all technical and scientific terms used herein have the same meaning as is commonly understood by one of ordinary skill in the art to which this disclosure belongs. In the event that there is a plurality of definitions for a term herein, those in this section prevail unless stated otherwise.

Where ever the phrase "for example," "such as," "including" and the like are used herein, the phrase "and without limitation" is understood to follow unless explicitly stated otherwise. Similarly, "an example," "exemplary" and the like are understood to be non-limiting.

The term "substantially" allows for deviations from the descriptor that don't negatively impact the intended purpose. Descriptive terms are understood to be modified by the term "substantially" even if the word "substantially" is not explicitly recited.

The term "about" when used in connection with a numerical value refers to the actual given value, and to the approximation to such given value that would reasonably be inferred by one of ordinary skill in the art, including approximations due to the experimental and or measurement conditions for such given value.

The terms "comprising" and "including" and "having" and "involving" (and similarly "comprises", "includes," "has," and "involves") and the like are used interchangeably and have the same meaning. Specifically, each of the terms is defined consistent with the common United States patent law definition of "comprising" and is therefore interpreted to be an open term meaning "at least the following," and is also interpreted not to exclude additional features, limitations, aspects, etc. Thus, for example, "a device having components a, b, and c" means that the device includes at least components a, b and c. Similarly, the phrase: "a method involving steps a, b, and c" means that the method includes at least steps a, b, and c.

Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

Any discussion of the prior art throughout the specification should in no way be considered as an admission that such prior art is widely known or forms part of common general knowledge in the field.

It is an object of the present invention to overcome or ameliorate at least one of the disadvantages of the prior art, or to provide a useful alternative.

FIG. 1 is a perspective view of a front, top and left-hand side (LHS) of a conveyor assembly 100 according to an embodiment of the present invention, shown coupled to a wood-chipper 200, which is indicated in dashed line.

Conveyor assembly 100 comprises a body 2 which is formed of a floor 4 from which opposing side walls 6a, 6b extend upwardly. A ground contact arrangement is provided in the form of left-hand side (LHS) and right-hand side (RHS) caster wheels 8a, 8b mounted on sidewalls 6a, 6b toward a leading portion 22 of the floor 4.

Figure 2:
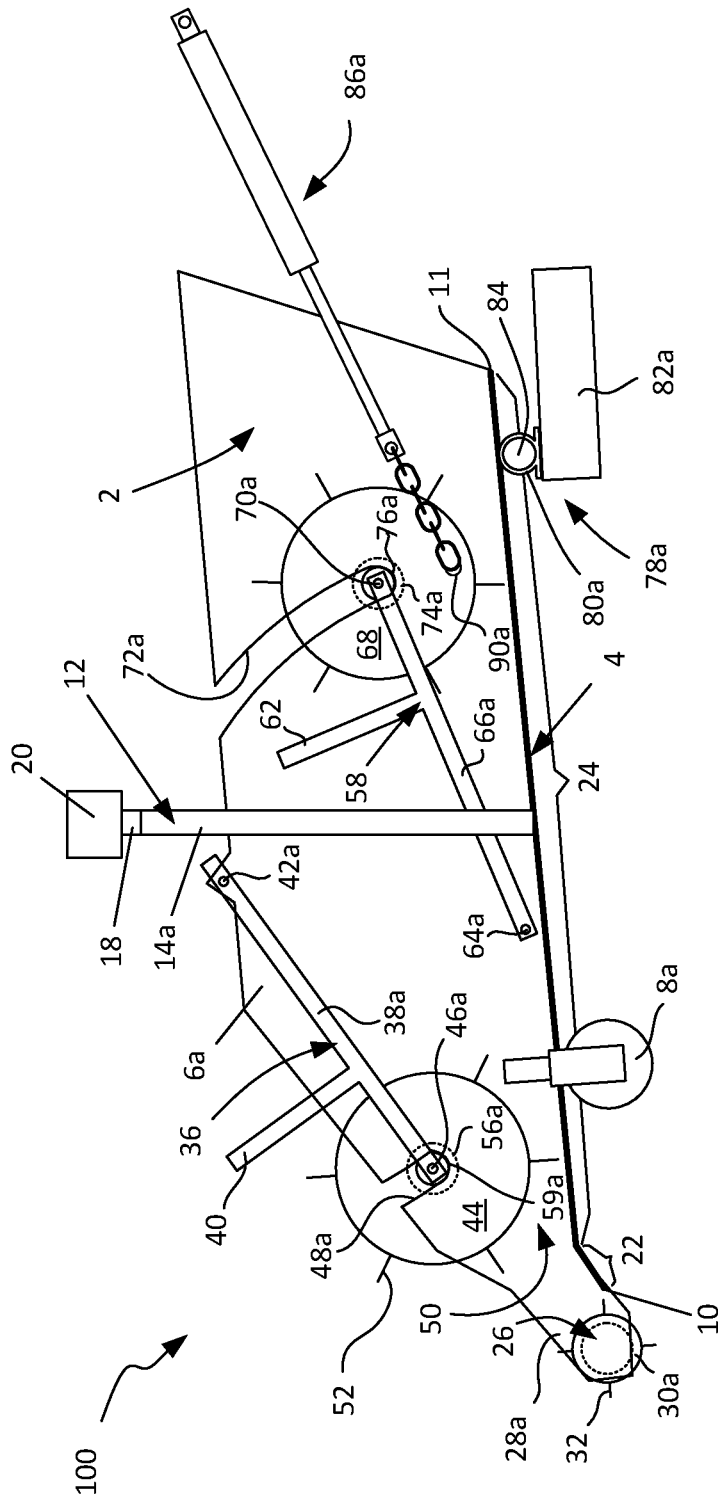
FIG. 2 is a view of the left-hand side of the conveyor assembly with side walls shown in outline only.

As may be seen in FIG. 2 onwards, the opposed side walls 6a, 6b are reinforced by a stiffening frame 12 (shown in FIG. 2 onwards) which is comprised of stiffening members in the form of first and second posts 14a, 14b that are attached to respective outer sides of side walls 6a, 6b. There is provided a cross member interconnecting upper portions of the first and second posts 14a, 14b in the form of a cross bar 18. A camera assembly 20 is fitted atop the cross bar 18 and houses rearward and forward-facing cameras for viewing the interior of the body between the opposed sidewalls. As will be explained, during operation video from the camera assembly may be viewed by an operator to ensure that the conveyor assembly 150 and wood-chipper 200 are operating correctly during use.

Floor 4 comprises the leading floor portion 22, which extends from a leading end 10 and a trailing floor portion 24, which extends rearwardly from the leading floor portion 22 to a trailing end 11. In use both the leading portion 22 and the trailing floor portion 24 slope upwardly and rearwardly with the leading portion sloping upwardly more steeply than the trailing portion due to the trailing portion and the leading portion forming an obtuse angle therebetween.

Figure 3:
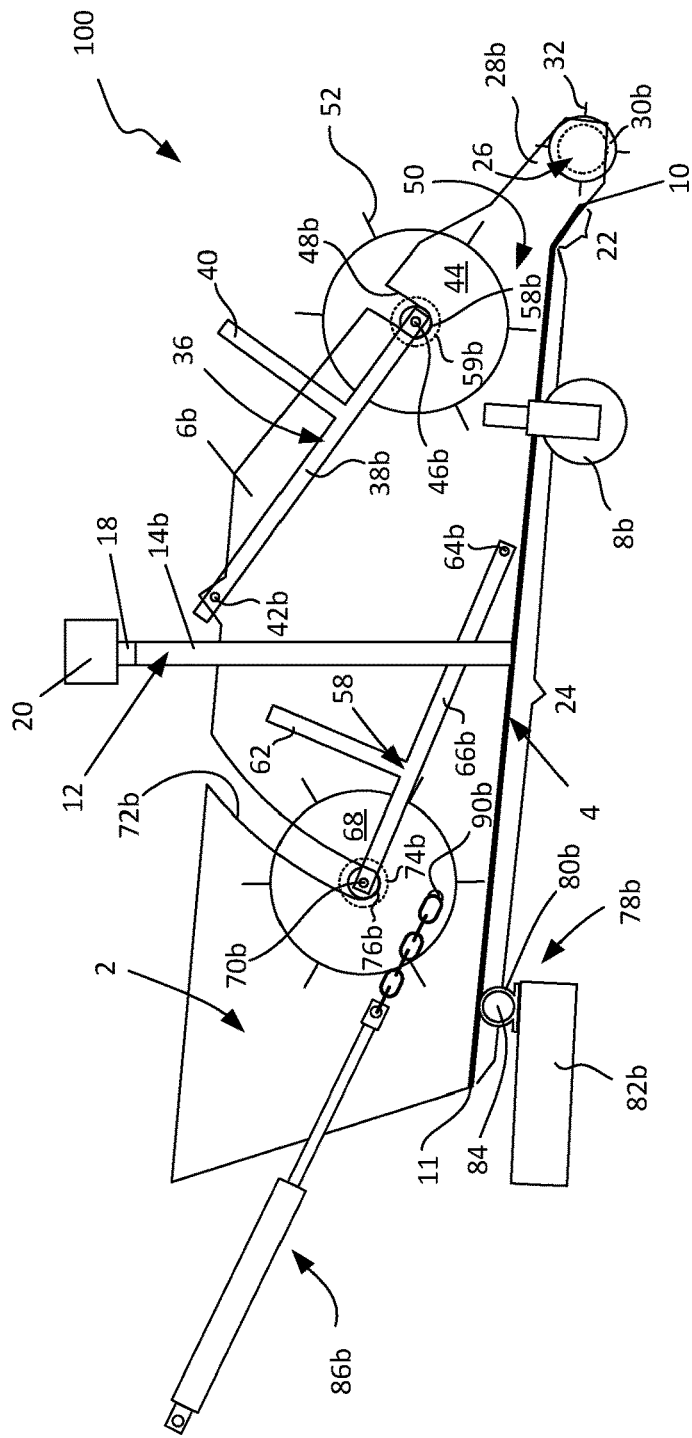
FIG. 3 is a view of the right-hand side of the conveyor assembly.
Figure 4:
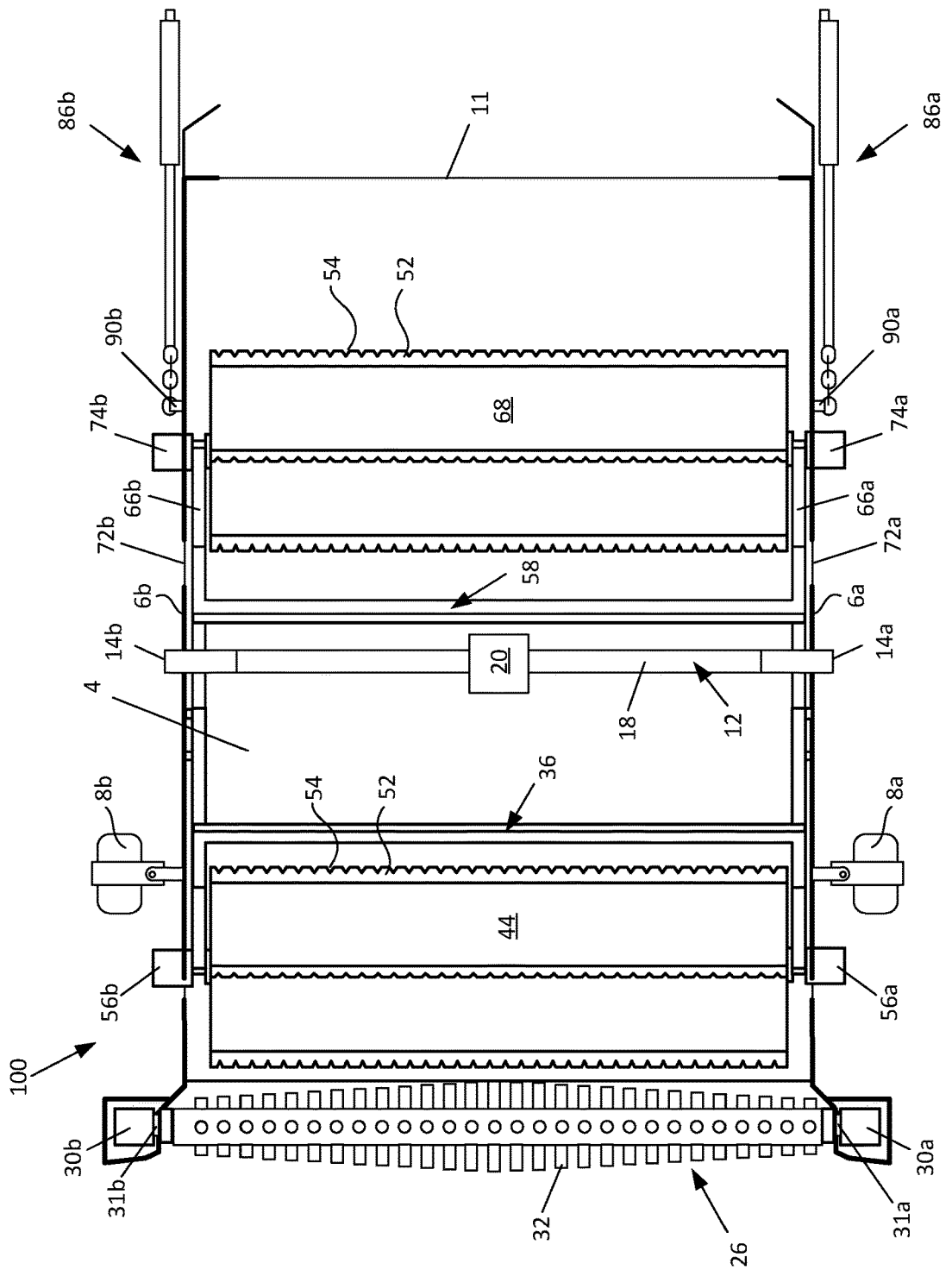
FIG. 4 is a top view of the conveyor assembly.
Figure 5:
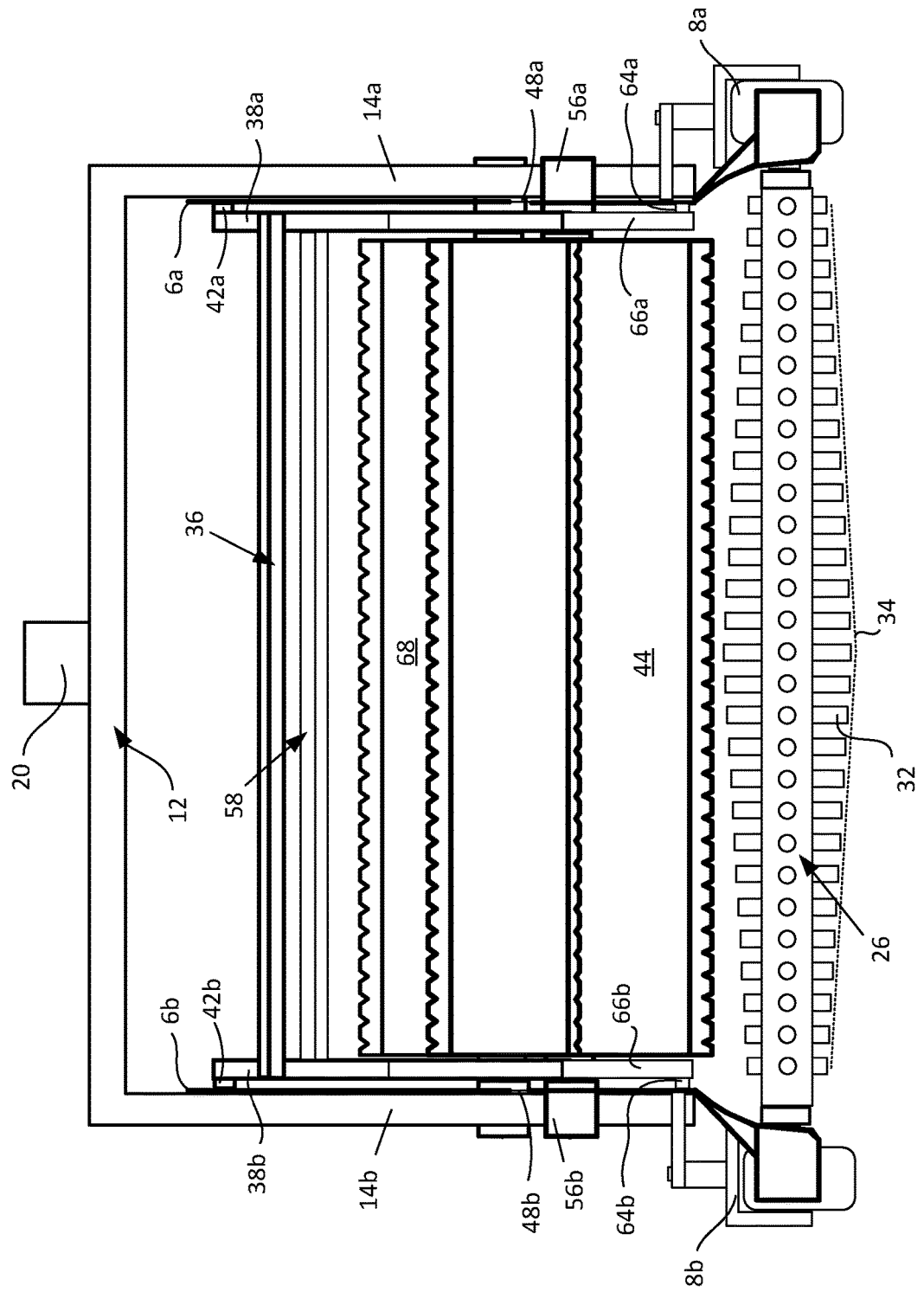
FIG. 5 is a front view of the conveyor assembly.

A leading feed roller in the form of butt feed roller 26 is located between opposed forward portions 28a, 28b of the LHS and RHS conveyor assembly walls 6a and 6b and adjacent leading end 10 of floor 4. Opposite ends 31a, 31b of an axle of the butt feed roller 26 extend through the forward portions 28a, 28b of the LHS and RHS conveyor assembly walls 6a and 6b. The opposite ends 31a, 31b of the axle 33 are mounted to respective hydraulic motors 30a, 30b for rotation thereof so that the leading feed roller is powered for rotation. The butt feed roller 26 includes a plurality of radially extending tines or "fingers" 32 (centrelines only of which are shown in FIGS. 2 and 3). The tines 32 may be circular in cross section as illustrated in FIGS. 4 and 5 or another shape such as rectangular, as illustrated in FIG. 1. The length of the tines increases towards the middle of the butt feed roller 26 so that a V-shaped envelope 34 (FIG. 5) of tips of the tines 32 is formed that describes a "V" shape which complements a cross section of an alley floor between rows of trees in an orchard. The alley floor may be formed thusly for enhanced water drainage. Accordingly, tines closest to a middle of the leading roller have a greatest length and tines at outer edges of the roller have a lesser length for complementing a transverse profile of the alley.

A first swing frame 36 is pivotally mounted between LHS and RHS conveyor assembly walls 6a and 6b, rearward of the butt feed roller 26 and above a forward region of the trailing portion 24 of conveyor assembly floor 4. The first swing frame 36 comprises LHS and RHS opposed arms 38a and 38b which are interconnected by a first swing frame cross member 40. LHS and RHS arms 38a and 38b are connected toward one end respectively to an upper portion of side walls 6a, 6b by first pivots 42a, 42b.

A primary infeed roller 44 is journaled between the forward ends of the RHS and LHS arms 38a, 38b with opposed axle ends 46a, 46b of an axle of the primary infeed roller 44 extending through the respective arms and coupled to respective motors 56a, 56b which are fast with the arms. Consequently, the primary infeed roller 44 is powered for rotation by the motors 56a, 56b. The axle ends 46a, 46b and/or portions of the motors 56a, 56b extend through respective first side wall openings 48a and 48b. Accordingly, the primary infeed roller 44 is mounted to the first swing frame 36 for movement concentric with the first pivots 42a, 42b. By arranging the first swing frame 36 to extend rearwardly from its remote ends between which the primary infeed roller 44 is mounted to pivots 42a and 42b, the entry 50 to the primary infeed roller is left clear for accepting branches without interference of the first swing frame.

The primary infeed roller 44 is generally cylindrical and includes a number of radially extending elongate stiffening ribs 52 located along its length. Each of the stiffening ribs 52 is formed with V-cuts 54 (identified in FIG. 4) along an outer edge for enhanced traction on tree branches and the like in use.

First opposed cutouts in the form of sidewall openings 48a, 48b are provided which are both arcuate and are both concentric with first pivots 42*a*, 42*b*, said pivots being coaxial. The axle ends 46*a*, 46*b* are coupled to LHS and RHS primary infeed roller motors 56*a* and 56*b* located on outer sides of the side walls 6*a*, 6*b* for powered rotation of the primary infeed roller. Lower limits 59*a*, 59*b* of the sidewall openings 48*a*, 48*b* are positioned a sufficient height above the trailing portion 24 of the floor 4 to provide clearance between the stiffening ribs 52 and the floor 4 whilst the primary infeed roller 44 is swung about pivots 42*a*, 42*b* to its lowest position. Consequently, the primary infeed roller 44 does not interfere with the floor 4, which would cause damage to the floor 4 and the ribs 52 of the roller 44 and also cause the primary infeed roller motors 56*a*, 56*b* to stall in some situations.

Accordingly, the first opposed cutouts in the form of sidewall openings 48*a*, 48*b* and the first infeed roller 44 are dimensioned so that the lower limit 59*a*, 59*b* of the second opposed cutouts 48*a*, 48*b* is spaced from the floor 4 a distance sufficient for the secondary infeed roller 48, including the ribs 52 that extend therefrom, to clear the floor 4.

A second swing frame 58 is pivotally mounted between LHS and RHS conveyor assembly walls 6*a* and 6*b*. The second swing frame 58 comprises LHS and RHS arms 60*a*, 60*b*, which are interconnected by a second cross member 62. Each of the LHS and RHS arms 60*a* and 60*b* are connected toward a leading respective end to a lower portion of side walls 6*a*, 6*b* by second pivots 64*a*, 64*b*.

A secondary infeed roller 68 is journaled between remote ends of the RHS and LHS first and second opposed arms 66*a*, 66*b*, with opposed ends 70*a*, 70*b* of an axle of the secondary infeed roller 68 extending through respective second opposed cutouts in the form of openings 72*a*, 72*b*. Openings 72*a*, 72*b* are each arcuate and concentric with pivots 64*a*, 64*b*, said pivots being coaxial. The axle ends 70*a*, 70*b* are coupled to LHS and RHS secondary infeed roller motors 74*a*, 74*b* for powered rotation of the secondary infeed roller 68. Lower limits 76*a*, 76*b* of the second sidewall openings 72*a*, 72*b* are positioned a sufficient height above the trailing portion 24 of the floor 4 to provide clearance between the stiffening ribs 52 of the secondary infeed roller 68 and the floor 4 whilst the secondary infeed roller 68 is swung to its lowest position as shown in FIGS. 2 and 3 for example. Accordingly, the second opposed cutouts in the form of sidewall openings 72*a*, 72*b* and the secondary infeed roller 68 are dimensioned so that the lower limit 76*a*, 76*b* of the second opposed cutouts 72*a*, 72*b* is spaced from the floor 4 a distance sufficient for the secondary infeed roller 68, including the stiffening ribs 52 that extend therefrom, to clear the floor.

LHS and RHS body pivot assemblies 78*a*, 78*b* are mounted beneath a rearward portion of the trailing portion 24 of floor 4. The LHS and RHS body pivot assemblies include bearings 80*a*, 80*b* which are mounted to supports 82*a*, 82*b*. The bearings journal opposed ends of a pivot axle 84 that runs beneath the floor 4 and which is fixed thereto. The supports 82*a*, 82*b* are for fixing to a forward lower underside of the wood-chipper 200 to thereby couple the conveyor assembly to the wood-chipper 200 in use.

Figure 6:
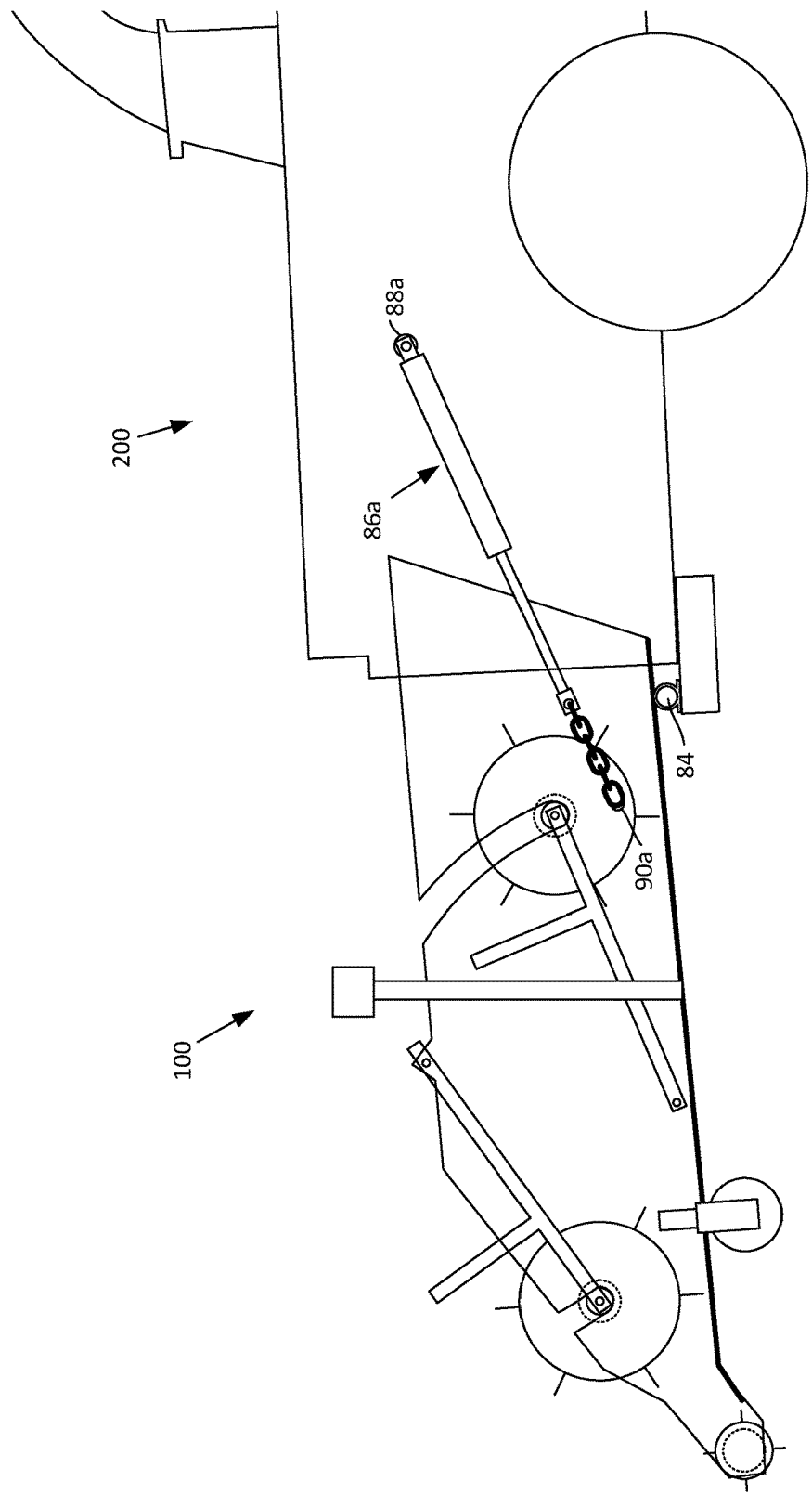
FIG. 6 is a side view of the conveyor assembly mounted to a processing assembly in the form of a wood-chipper.

LHS and RHS linear hydraulic ram assemblies 86*a*, 86*b* are provided to extend on opposite sides of the body 2 from pivot points 88*a*, 88*b* (shown in FIG. 6) on the wood-chipper 200 to respective pivot points 90*a*, 90*b* (visible in FIGS. 2, 3, 4) on the outside of the walls 6*a*, 6*b* of the conveyor assembly 100. Accordingly, in use by actuating the hydraulic ram assemblies 86*a*, 86*b* the body 2 pivots about axle 84 so that the leading end of the conveyor assembly, and thus the butt feed roller 26, may be lowered or raised as desired.

Figure 7:
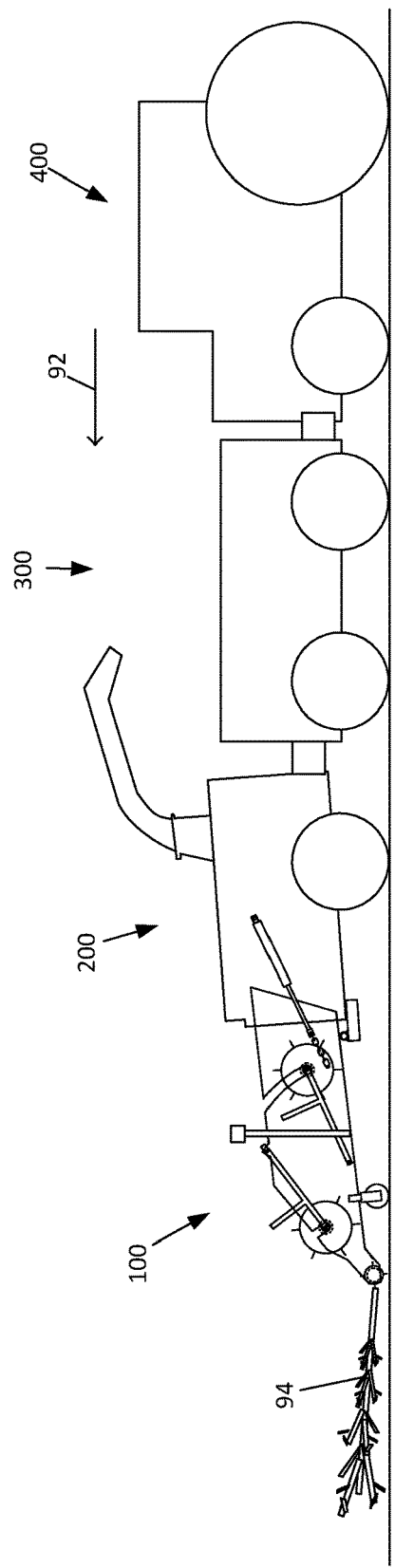
FIG. 7 is a side view of the conveyor assembly in use mounted to a wood-chipper which is in turn mounted to a bin which is in turn mounted to an automotive vehicle in the form of a tractor.

With reference to FIG. 7, in use the conveyor assembly 100 is coupled to the wood-chipper 200. The wood-chipper is in turn coupled to a front end of a mobile bin 300. The bin 300 is coupled to the front of a tractor 400.

The tractor then proceeds in the direction indicated by arrow 92 so that it pushes the bin 300 and in turn the wood-chipper 200 and the conveyor assembly 100 until it encounters a fallen branch 94.

Figure 8:
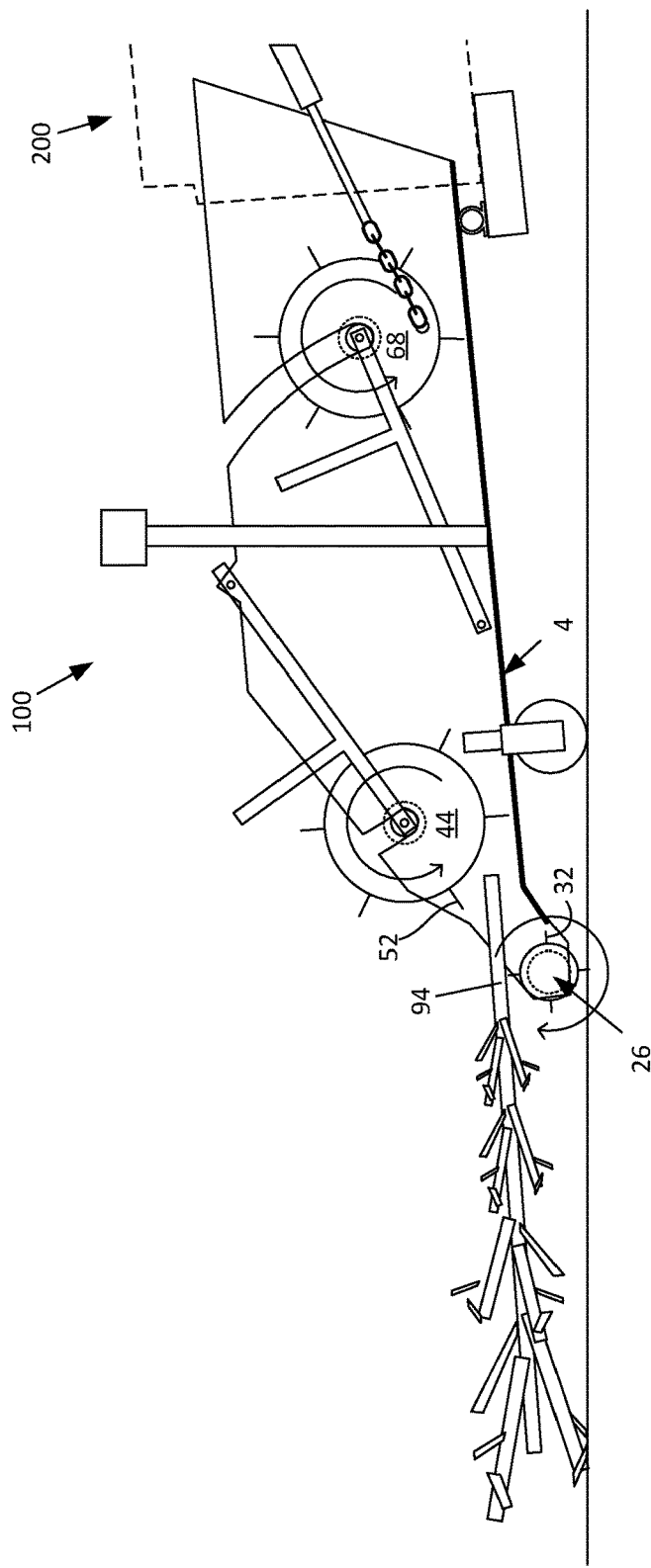
FIGS. 8 to 10 illustrate the conveyor assembly in progressive states of operation.

Referring now to FIG. 8, prior to making contact with branch 94 the hydraulic linear actuator assemblies 86*a*, 86*b* are operated to lower the front of the conveyer assembly 100 down so that the tines of the butt feed roller 26 come very close to contacting the ground.

Figure 9:
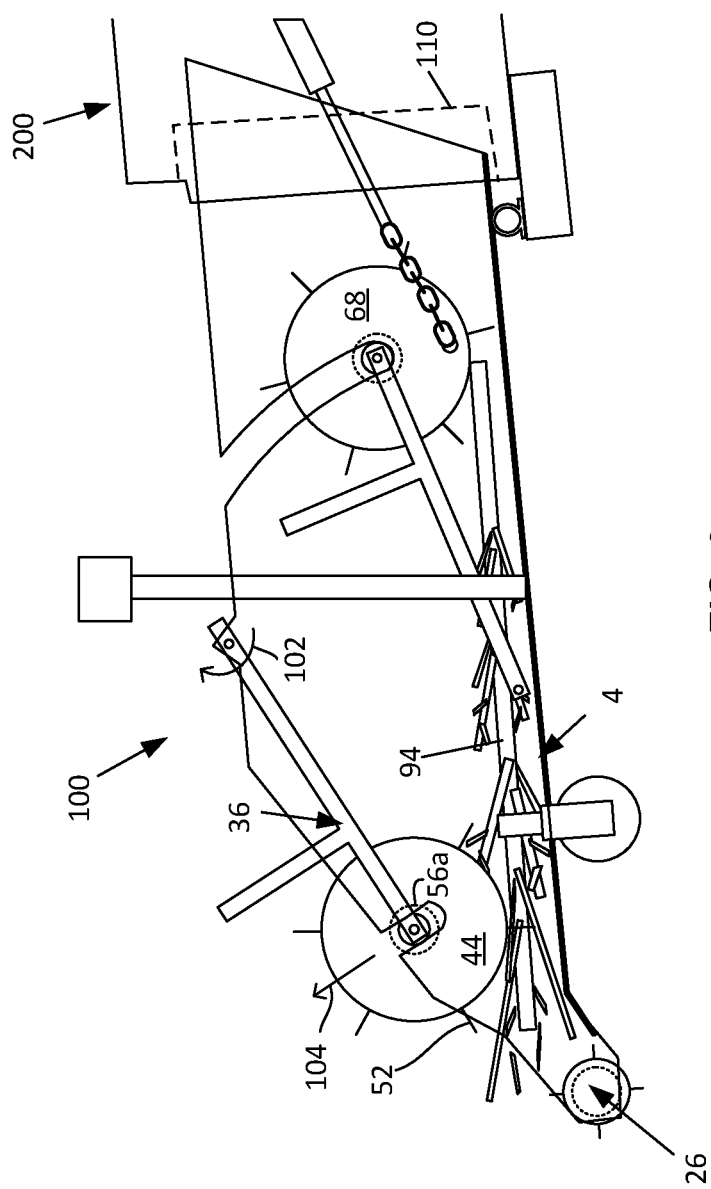
Figure 10:
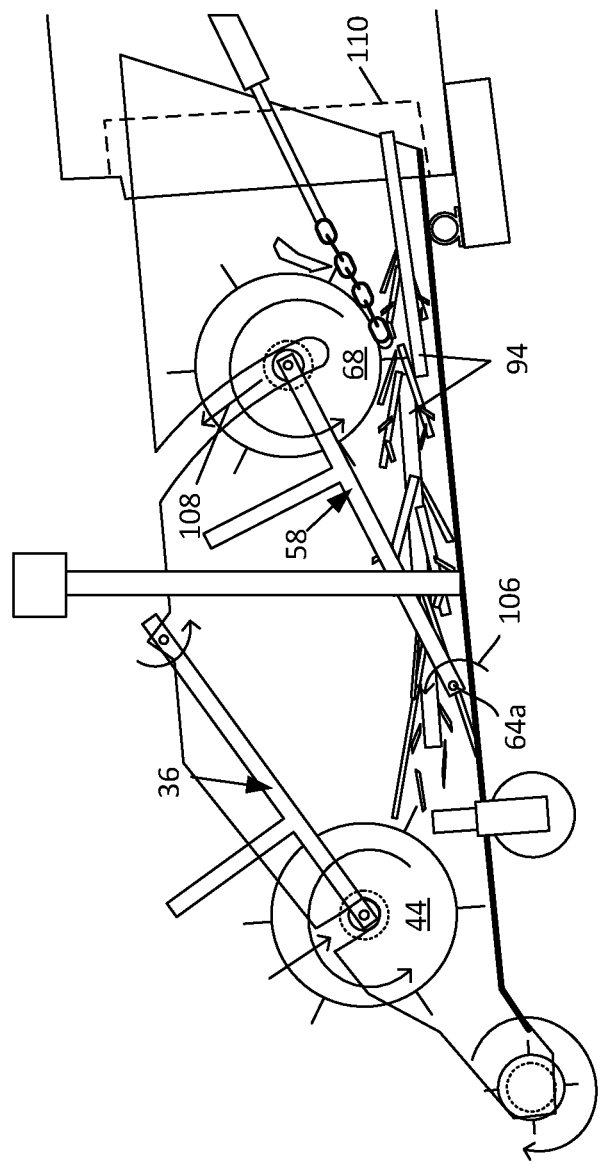

The various hydraulic motors are then activated so that they rotate the butt feed roller 26, the primary infeed roller 44 and the secondary infeed roller 68 as indicated in the FIGS. 8 to 10.

Initially, as shown in FIG. 8 butt feed roller 26, by means of its radially extending tines 32 lifts the branch 94 and draws it over the butt feed roller 26 and onto floor 4 and thence into engagement with the ribs 52 of the primary infeed roller 44.

Referring now to FIG. 9, as the branch 94 proceeds under the primary infeed roller 44 the bulk of its foliage forces upwardly on the primary infeed roller 44 so that the first swing frame 36 pivots clockwise, as indicated by arrow 102, and thus the primary infeed roller 44 rises as indicated by arrow 104. Accordingly, the primary infeed roller 44 continues to press down upon the branch with its weight thereby providing sufficient force for its ribs 52 to continue to urge the branch 94 further rearward along the conveyor assembly 100 whilst avoiding stalling of the motors 56*a*, 56*b* that power the primary infeed roller 44. The primary infeed roller 44 is able to swing upwardly to allow large branches to be urged rearwardly beneath it by the action of its ribs without stalling occurring.

Interaction of the primary infeed roller 44 with the branch 94 forces the branch 94 sufficiently rearward to then come into interaction with secondary infeed roller 68. The secondary infeed roller 68 tends to rise as shown in FIG. 10, which it is able to do due to its being mounted to second swing frame 58 in response to the branch moving beneath. The second swing frame 58 pivots in the direction indicated by arrow 106 about pivots 64*a*, 64*b* to allow the secondary infeed roller to rise as indicated by arrow 108 so that the branch 94 proceeds to the wood-chipper inlet 110 whilst the secondary infeed roller 68 continues to rotate and press against the branch 94 due to the weight of the second swing frame 56 and the secondary infeed roller 68. The secondary infeed roller 68 acts to hold the branch 94 and progressively feed it into the wood-chipper inlet 110.

In earlier embodiments the second swing frame 58 was fitted in a parallel configuration to that of the first swing frame 36, i.e. with its remote end facing forward and the pivots for the second swing frame located along an upper portion of the side walls 6*a*, 6*b*. However, it was found that when the v-cut ribs 52 of the secondary infeed roller 68 grabbed and pulled the branches the ribs tended to bite down on the branches and cause stalling of the motors driving the secondary infeed roller. One solution to the problem may have been to employ upwardly directed spring biasing on the second swing frame to reduce the downward biting action however such a solution would be more complex than the preferred embodiment that has been illustrated. Accordingly, the arrangement of the second swing frame 58 that is shown in the presently described embodiments is preferred.

Figure 11:
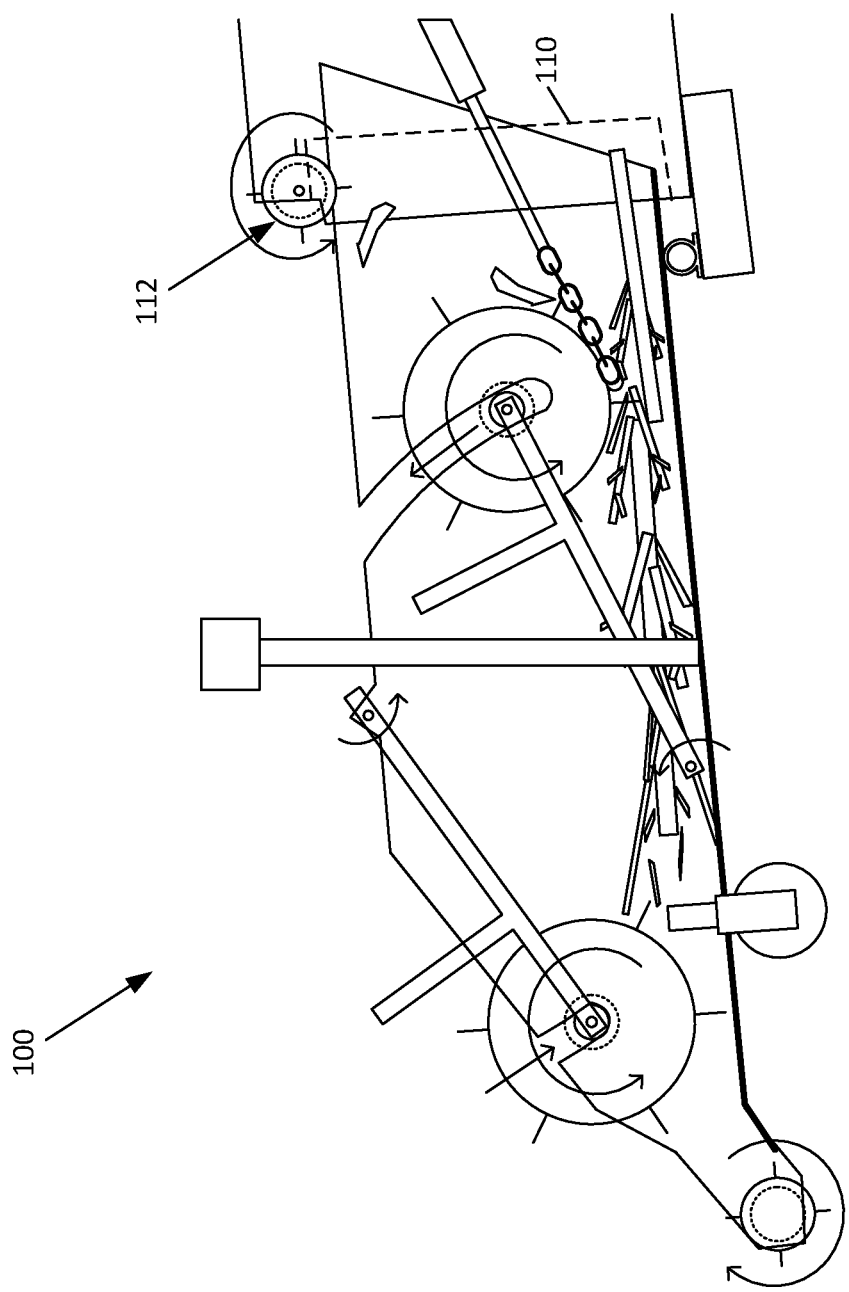
FIG. 11 is a side view of a further embodiment of a conveyor assembly which includes a tertiary infeed roller mounted above and adjacent an inlet of the wood-chipper.

FIG. 11 shows a further embodiment of a conveyor assembly which includes a tertiary roller 112 with elongate ribs that is mounted just above the wood-chipper inlet 110. The tertiary roller 112 is also powered at opposite ends by hydraulic motors to which it is coupled. In use it rotates as indicated in FIG. 11 so that foliage from the branch that may fly up due to the rotation of the secondary infeed roller is directed into the wood-chipper inlet 110 by the tertiary infeed roller 112.

In some embodiments guide plates may be fitted on opposed sides of the arms 38a, 38b and 66a, 66b of the first and second swing frames 36, 58 respectively to reduce the likelihood of branches being caught by the frame arms.

In use the tractor 400 proceeds slowly down the alley between the rows of orchard trees thereby pushing the bin 300, wood-chipper 200 and conveyor assembly 100 so that the conveyor assembly progressively picks up and fees branches and other debris to the wood-chipper. The wood-chipper chips the material received from the conveyor assembly and deposits chipped material from its outlet chute into the bin. The tractor driver monitors the operation of the conveyor assembly 100 and the wood-chipper by means of a video display screen in the cabin of the tractor that is coupled to the camera assembly 20.

Various guides, such as posts may be arranged on opposite forward portions of the sidewalls 6a, 6b of the conveyor assembly 100, which extend above the sidewalls 6a, 6b to assist in feeding branches into the conveyor assembly.

As discussed, ends of the axles of each of the infeed butt roller 26 and the primary, secondary and tertiary infeed rollers 44, 68 and 112 are fitted with hydraulic motors to turn their respective rollers.

The motors are all powered with hydraulic oil from a hydraulic remote power source of the tractor 400 via a hydraulic circuit including hoses and valves as is usual for agricultural machinery.

The hoses and valves are preferably arranged to initially power the secondary infeed roller motors, then the primary infeed roller motors and the butt lifter roller. Consequently, any branches under the secondary infeed roller are firstly urged toward the chipper 300 before the primary infeed roller starts to push branches toward the secondary infeed roller, which could cause jamming and stalling of the motors. Hydraulic cross line relief valves are preferably fitted between all the roller motors to protect the hydraulic circuit in case of rollers stalling.

It is preferable that the primary and secondary powered rollers are matched to the infeed rollers of the wood-chipper. Wood-chippers typically have an engine protection system that monitors the engine driven speed of the wood-chipper's feed-in drums. If that speed slows below a preset speed then the engine protection system stops the chipper infeed rollers which allows the engine speed, driving the chipper drum to regain its correct operating speed since it is then not under any extra load itself. Should the wood-chipper infeed rollers stop, the respective motors of the butt feed roller, primary infeed roller and secondary infeed roller are also automatically stopped. That is done by an electric valve that is arranged to be responsive to the wood-chipper engine protection system and which controls valves of the conveyor assembly hydraulic circuit to stop the motors of the butt feed roller and the primary, and secondary infeed rollers.

Upon the wood-chipper engine protection system determining that the wood-chipper engine has regained its correct operating speed it starts the vertical infeed rollers of the wood-chipper which then then start turning to feed the timber trees and branches into the wood-chipper. Upon that occurring the conveyor assembly electric hydraulic valve also restarts the hydraulic motors of the butt feed roller and the primary and secondary infeed rollers.

The tractor driver uses camera assembly 20 to view infeed rollers visible through the inlet 110 of the wood-chipper 200. If the wood-chipper infeed rollers stop turning because the engine speed protection system has stopped the their operation then the tractor driver must temporarily stop the tractor moving forward until the wood-chipper 200 regains correct operating speed using its own engine protection system.

Whilst the conveyor assembly 100 that has been described in the preferred embodiments mentioned herein makes use of a leading butt roller 26 and two infeed rollers 44, 68, other less preferred embodiments may make use of only a single infeed roller, e.g. the secondary infeed roller or the primary infeed roller in conjunction with the butt feed roller. However, such an arrangement is significantly less preferred because it requires that the conveyor assembly floor be angled more steeply overall in order to raise the branches from the ground to the wood-chipper inlet and thus there is a greater likelihood that some branches will not feed correctly into the leading end of the conveyor assembly.

It will therefore be realized that in an embodiment a conveyor assembly for raising and feeding debris such as fallen branches from an orchard floor to a processor such as a wood-chipper is provided. The conveyor assembly comprises a body including a floor having a leading end for location adjacent ground level and a trailing end for location above the leading end in use. A ground contact arrangement is located toward the leading end extends beneath the leading end to thereby raise the leading end above ground level. A powered leading feed roller is disposed adjacent the leading end of the floor to direct members from ground on to the floor. A powered, primary infeed roller is located rearward the leading infeed roller and is arranged to move toward and away from the floor to accommodate members between said roller and the floor and urge the members, such as fallen branches rearward for entry into an inlet of the wood-chipper.

In another embodiment a method for clearing ground of fallen tree branches is provided that includes coupling a bin for receiving wood-chips to a front of an automotive vehicle. The method further includes coupling a processing apparatus such as a wood-chipping machine to a front of the bin so that an outlet of the wood-chipping machine is located to deliver wood-chips to the bin and an inlet of the wood-chipping machine faces away from the bin. A conveyor assembly us coupled to the wood-chipping machine wherein the conveyor assembly includes a floor extending from a lower leading end to an elevated rearward end thereof. The conveyor assembly includes a leading powered roller to lift the fallen tree branches onto the floor and one or more powered rollers trailing the leading powered roller to urge the branches rearward to the wood-chipping machine inlet. The method also includes operating the automotive vehicle to move the bin, wood-chipping machine and conveyor assembly forward over the ground so that the fallen tree branches are progressively drawn into the conveyor assembly, processed by the wood-chipper with the resulting chips delivered from the outlet of the wood-chipping machine into the bin.

Any embodiment of the invention is meant to be illustrative only and is not meant to be limiting to the invention. Therefore, it should be appreciated that various other changes and modifications can be made to any embodiment described without departing from the spirit and scope of the invention.

We claim:

1. A conveyor assembly comprising:
    a body including:
        a floor having a leading end for location adjacent ground level and a trailing end for location above the leading end in use, and
        opposed sidewalls rising from opposite sides of the floor;
    a ground contact arrangement toward the leading end extending beneath the leading end to raise the leading end above ground level;
    a leading feed roller extending between the opposed sidewalls, the leading feed roller being powered for rotation thereof and disposed adjacent the leading end of the floor to direct members from ground on to the floor; and
    a primary infeed roller extending between the opposed sidewalls that is powered for rotation thereof and located trailing the leading feed roller, the primary infeed roller moveably coupled to the opposed sidewalls for movement toward and away from the floor to accommodate members between the primary infeed roller and the floor and to urge the members rearward; and
    a first swing frame connected between the opposed sidewalls by one or more first pivots wherein the primary infeed roller is mounted to the first swing frame at a distance from the one or more first pivots to move in an arc about the one or more first pivots.

2. The conveyor assembly of claim 1, wherein the first pivots are located rearward of the primary infeed roller.

3. The conveyor assembly of claim 1, wherein the first swing frame includes first and second opposed arms.

4. The conveyor assembly of claim 3, including a secondary infeed roller that is powered for rotation thereof and located trailing the primary infeed roller, the secondary infeed roller moveably coupled to the opposed sidewalls for movement toward and away from the floor to accommodate members between the secondary infeed roller and the floor and to urge the members rearward.

5. The conveyor assembly of claim 4, wherein the first and second opposed arms of the first swing frame are interconnected by a first cross member.

6. The conveyor assembly of claim 5, wherein including a second swing frame connected between the opposed sidewalls by one or more second pivots wherein the secondary infeed roller is mounted to the second swing frame at a distance from the one or more second pivots to move in an arc about the one or more second pivots.

7. The conveyor assembly of claim 6, wherein the one or more first pivots are located below the one or more second pivots.

8. The conveyor assembly of claim 6, wherein the one or more second pivots are located forward of the secondary infeed roller.

9. The conveyor assembly of claim 8, wherein the one or more first pivots are located rearward of the one or more second pivots.

10. The conveyor assembly of claim 7, wherein the second swing frame includes first and second opposed arms.

11. The conveyor assembly of claim 10, wherein the first and second opposed arms of the second swing frame are interconnected by a second cross member.

12. The conveyor assembly of claim 11, wherein the first cross member is at right angles to the first and second opposed arms of the first swing frame; and wherein the second cross member is at right angles to the first and second opposed arms of the second swing frame.

13. The conveyor assembly of claim 12, including:
    first opposed cutouts formed through the opposed sidewalls; and
    respective motors coupled to axle ends of the primary infeed roller for powered rotation thereof, wherein portions of the respective motors and/or the axle ends extend through the first opposed cutouts whereby the first opposed cutouts accommodate rising and falling of the primary infeed roller.

14. The conveyor assembly of claim 13, wherein the first opposed cutouts are arcuate and coaxial with the first pivots and wherein the first opposed cutouts and the primary infeed roller are dimensioned so that a lower limit of the first opposed cutouts is spaced from the floor a distance sufficient for the primary infeed roller to clear the floor.

15. The conveyor assembly of claim 12, wherein the body includes:
    second opposed cutouts formed through the opposed sidewalls;
    respective motors coupled to axle ends of the secondary infeed roller for powered rotation thereof; and
    wherein the respective motors and/or the axle ends extend through the second opposed cutouts whereby the second opposed cutouts accommodate rising and falling of the secondary infeed roller.

16. The conveyor assembly of claim 15, wherein the second opposed cutouts are arcuate and coaxial with the second pivots.

17. The conveyor assembly of claim 16, wherein the second opposed cutouts and the secondary infeed roller are dimensioned so that a lower limit of the second opposed cutouts is sufficiently spaced from the floor for the secondary infeed roller to clear the floor.

18. The conveyor assembly of claim 1, wherein the leading feed roller includes radially extending tines presenting a V-shaped envelope wherein tines closest to a middle of leading feed roller have a greatest length and tines at outer edges of the leading feed roller have a lesser length for complementing a transverse profile of an alley of an orchard.

19. The conveyor assembly of claim 1, including:
    stiffening members located along the opposed sidewalls of the body for stiffening thereof including first and second posts extending upwardly along the opposed sidewalls;
    a cross member interconnecting upper portions of the first and second posts; and
    a camera assembly mounted to the cross member for remote viewing of an interior of the body.

20. A method for clearing fallen tree branches comprising the steps of:
    coupling a bin for receiving wood-chips to a front of an automotive vehicle;
    coupling a wood-chipping machine to a front of the bin wherein an outlet of the wood-chipping machine is located to deliver wood-chips to the bin and an inlet of the wood-chipping machine faces away from the bin;
    coupling a conveyor assembly to the wood-chipping machine wherein the conveyor assembly includes a floor extending from a lower leading end to an elevated rearward end, the conveyor assembly including a leading powered roller to lift the fallen tree branches onto the floor and one or more powered rollers trailing the leading powered roller to urge the branches rearward to the inlet of the wood-chipping machine, the one or more powered rollers comprising a primary infeed roller extending between opposed sidewalls that is powered for rotation thereof and located trailing the leading powered roller, the primary infeed roller moveably coupled to the opposed sidewalls for movement toward and away from the floor to accommodate the fallen tree branches between the primary infeed roller and the floor and to urge the fallen tree branches rearward, and a first swing frame connected between the opposed sidewalls by one or more first pivots wherein the primary infeed roller is mounted to the first swing frame at a distance from the one or more first pivots to move in an arc about the one or more first pivots; and operating the automotive vehicle to move the bin, woodchipping machine and conveyor assembly forward over the ground.

\* \* \* \* \*